United States Patent [19]

Oishi et al.

[11] Patent Number: 4,530,017
[45] Date of Patent: Jul. 16, 1985

[54] MAGNETIC RECORDING DISK CARTRIDGE

[75] Inventors: Kengo Oishi; Tuyoshi Ono, both of Odawara, Japan

[73] Assignee: Fuji Photo Film Company Ltd., Kanagawa, Japan

[21] Appl. No.: 516,350

[22] Filed: Jul. 22, 1983

[30] Foreign Application Priority Data

Aug. 2, 1982 [JP] Japan .................................. 57-134943

[51] Int. Cl.³ .............................................. G11B 15/04
[52] U.S. Cl. .................................................... 360/60
[58] Field of Search .................................. 360/60, 132

[56] References Cited

U.S. PATENT DOCUMENTS 3,828,363  8/1974  Somers ................................. 360/60
3,848,265  11/1974  Biery et al. .......................... 360/60
4,044,386  8/1977  Sarou et al. .......................... 360/60
4,320,422  3/1982  Rinkleib .............................. 360/60

Primary Examiner—Vincent P. Canney
Attorney, Agent, or Firm—Murray, Whisenhunt & Ferguson

[57] ABSTRACT

A magnetic recording disk cartridge is provided with an opening in its casing and a swingable erasing preventing unit inside the casing which can assume an open position in which a probe in the device in which the cartridge is used can enter the opening to detect that the cartridge is in an erasing prohibited condition or a closed position in which the probe is prevented from entering the opening to detect that the cartridge is in an erasing permitted condition. The erasing preventing unit has a detent which holds it in the open position until released by two coordinated actions and a lockarm which holds it in the closed position until pushed with the finger, thus precluding misoperation.

4 Claims, 4 Drawing Figures

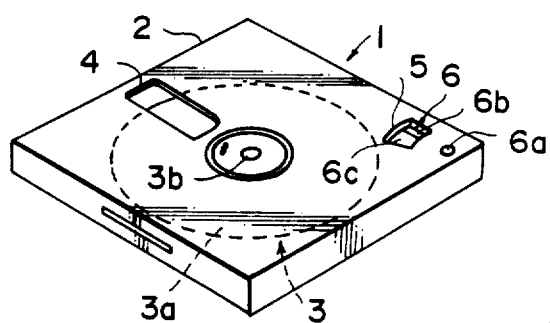
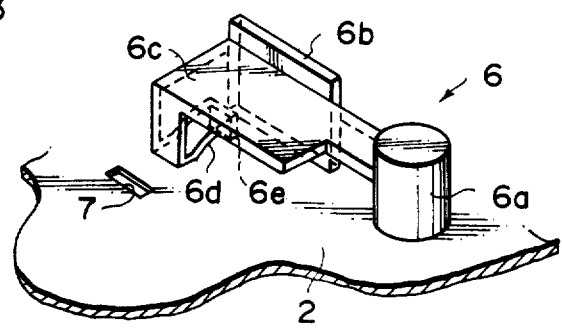
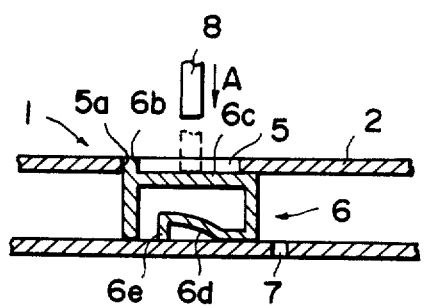
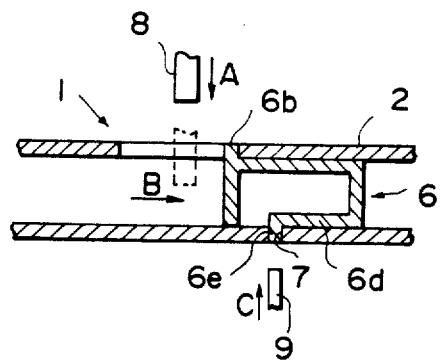

4,530,017

MAGNETIC RECORDING DISK CARTRIDGE

BACKGROUND OF THE INVENTION

1. Field of the Invention

This invention relates to a magnetic recording disk cartridge, and particularly to a cartridge for accommodating a very thin and small magnetic recording disk which is adapted to rotate at a high speed about its center when recording and reproducing video signals.

2. Description of the Prior Art

As is well known, a magnetic recording disk or floppy disk consists of a flexible polyester sheet disk having a magnetic substance applied to both sides of the disk sheet for recording digital information. The floppy disk has been widely used as a recording medium for computers because it is easy to handle and inexpensive to produce.

A still camera using a floppy disk in place of a photographic film has been invented. In this camera, in addition to the advantages mentioned above, the floppy disk can be used repeatedly in taking pictures. This repeated use is characteristic of a magnetic recording medium, and cannot be realized with a conventional silver halide-coated film. To be appropriate for the purpose of taking pictures, however, the floppy disk must be small in size, specifically small in diameter and thin in thickness, and the casing for accommodating such a small floppy disk for use in a still camera must be reduced in size accordingly. In this connection it has been proposed that a cased magnetic recording disk or hard floppy disk (hereinafter referred to simply as "cartridge") be rotated at a high-speed during recording and playback. This has led to the appearance of a magnetic recording type 35 mm still camera.

Reusable recording medium units are equipped with means for preventing any erroneous erasing of recorded information due to a wrong operation by the user, and generally such erroneous erasing preventing means is provided by designing the casing to enable the user to partly change its shape according to whether the required condition is "erasing forbidden" or "erasing permitted".

For instance, in case of a floppy disk or an audio-cassette, an associated casing is partly notched, or is provided with a recess in its side, and then a piece of adhesive tape or a label is applied to the notched part or recess of the casing when erasing is permitted, and the piece of tape or the label is removed when erasing is forbidden.

Applying and removing a piece of adhesive tape or a label to and from the casing is inconvenient and troublesome. Still disadvantageously, repeated use of the adhesive tape or label will cause its adhesiveness to deteriorate to the point where the tape or label will easily peel off from the casing, so that the state of "erasing forbidden" is not assured at all times. The same defect appears when the adhesiveness deteriorates with time.

SUMMARY OF THE INVENTION

The object of this invention is to provide a cartridge equipped with an erroneous erasing preventing means, requiring no troublesome handling but still assuring the prevention of erroneous erasing at all times.

To attain this object a cartridge according to this invention comprises a closure plate swingable across a window cut in a casing from the open position to the closed position, and vice versa. Specifically, a window opening (hereinafter referred to simply as an "opening") is cut in one major surface of a casing in the vicinity of a corner where nothing lies below. A swingable closure plate is provided as an erroneous erasing preventing means, and the closure plate is movable by finger from the open position to the closed position and vice versa. A lockarm is integrally connected to the swingable closure plate. The lockarm is resiliently biased to push itself against the inner surface of the bottom plate of the casing, thereby causing the lockarm to be caught and positively locked by a catch means when the associated closure plate is brought to the "erasing forbidden" position, in which the opening is not closed (is open).

The closure plate may have a finger-catch projection rising high enough to appear in the opening to the extent that the projection is easily caught with the finger, thus facilitating the shift of the closure plate from the closed position to the open position for the sake of preventing erroneous erasing. A lockarm may have a detent projection provided thereon, and then a through hole in the bottom plate of the casing is provided at such a place that the detent projection of the lockarm when brought to the "erasing forbidden" position, may snap in the through hole, thus positively locking the lockarm in position, and eliminating any danger of undesired release of the lockarm from the "erasing forbidden" position which release, otherwise, would be caused if the finger-catch projection rising from the closure plate should happen to strike against something.

In a cartridge according to this invention an erroneous erasing preventing unit is swingable across an opening of a casing, and the erroneous erasing preventing closure plate is adapted to be locked at the position in which the opening is not closed by the closure plate. With this arrangement the user can easily select either the "erasing forbidden" position or the "erasing permitted" position, and once the "erasing forbidden" position has been selected, the action of preventing any erroneous erasing is very reliable, causing no adverse effect in any possible unfavorable situation.

This invention will be better understood from the following description of a preferred embodiment, which is shown in the accompanying drawings.

BRIEF DESCRIPTION OF THE DRAWINGS

FIG. 1 is a perspective view of a cartridge according to one embodiment of this invention;

FIG. 2 is a perspective view of an erroneous erasing preventing unit with which the cartridge of FIG. 1 is equipped;

FIG. 3A is a longitudinal section of a part of the erroneous erasing preventing unit in its closed position; and FIG. 3B is a longitudinal section of a part of the erroneous erasing preventing unit in its open position.

DESCRIPTION OF THE PREFERRED EMBODIMENT

Referring to FIGS. 1 and 2, a cartridge 1 is composed of magnetic recording medium 3 consisting of a very thin flexible recording disk 3a having a hub 3b at its center, and a generally square casing 2 containing the magnetic recording medium 3. The flexible recording disk 3a is composed of a 50 micron or thinner polyester sheet disk having a magnetic film formed thereon, for instance, by coating, evaporating or sputtering a magnetic material thereon, and the so-formed magnetic film is capable of storing information. An access opening 4 appropriate for receiving a magnetic recording head is made in the intermediate part on one side of the generally square casing extending radially from the center of the hub 3b of the floppy disk towards the side. As shown, another opening 5 is made in the vicinity of a corner of the ceiling plate of the square casing. When the opening is not closed, this indicates that the cartridge is in the "erasing forbidden" condition, whereas when the opening is closed, this indicates that the cartridge is in the "erasing permitted" condition. FIG. 2 shows, in detail, the structure of an erroneous erasing preventing unit 6, which is swingable across the opening 5 from the open position ("erasing forbidden") to the closed position ("erasing permitted") and vice versa. As shown in FIG. 2, the erroneous erasing preventing unit is composed of: a cylindrical post 6a rotatably fixed to the ceiling and bottom plates of the casing 2 at a place apart from the opening 5 and fairly close to the corner of the casing 2; a closure plate 6c extending from the cylindrical post 6a below and along the inside surface of the ceiling plate of the casing 2; a finger catch projection 6b rising from one side of the closure plate 6c and appearing in the opening 5, thereby facilitating the shift of the closure plate across the opening 5; a lockarm 6d extending from the closure plate 6c downward to the inside surface of the bottom plate of the casing 2 and the rising thereabove, thus pushing against the inside surface of the bottom plate and, as a counteraction, resiliently biasing the closure plate 6c towards the ceiling plate of the casing; and a descending projection or detent 6e extending downward from the rising end of the lockarm thus to snap in a through hole 7 in the bottom plate of the casing when the closure plate is brought to the "erasing forbidden" position, thereby positively locking the erroneous erasing preventing unit against accidental release due to any exterior force applied thereto. As shown in FIGS. 3A and 3B, finger catch projection 6b extends in the opposite direction, that is, down to the inner surface of the bottom plate of the casing, thereby resisting the push applied to the closure plate 6c by a probe 8 for detecting whether the cartridge 1 is in the "erasing forbidden" position. Parts of the erroneous erasing preventing unit 6 other than its lockarm 6d may be made of molded plastic, thereby generating a desired resilience in the lockarm. Then, the lockarm may be made of a metal.

FIG. 3A shows the closed position in which the erroneous erasing preventing unit 6 is moved to close the opening 5 whereas FIG. 3B shows the open position in which the erroneous erasing preventing unit is moved to open the opening 5. When the finger catch projection 6b of the closure plate 6c is brought to one side 5a of the opening 5, the opening 5 is closed by the closure plate 6c. In this state, when a probe 8 is inserted in the direction as indicated by arrow "A", it will come into contact with the closure plate 6c and will stop there, thus permitting the probe to detect that the opening 5 is closed, that is, that the cartridge 1 is in the condition of "erasing permitted". In this closed condition the detent 6e at the rising end of the lockarm 6d applies a resilient force against the inner surface of the bottom plate of the casing 2, and as a counter action the closure plate 6c is resiliently pushed against the inner surface of the ceiling plate of the casing 2, thus preventing accidental opening of the closure plate which, otherwise, would be caused for instance, if the cartridge 1 is inclined or is subjected to an external shock.

When the closure plate 6c is shifted in the direction as indicated by arrow "B" by pushing the finger catch projection 6b with the finger, thereby opening the opening of the ceiling plate of the casing, the detent 6e of the lockarm 6d snaps in the through hole 7 in the bottom plate of the casing. In the open condition shown in FIG. 3B when the probe 8 is inserted into the casing 2 in the direction as indicated by arrow "A", it reaches the inside surface of the bottom plate of the casing, thus indicating that the opening is not closed, that is, that the cartridge 1 is in the condition of "erasing forbidden". In this locking condition even if the finger catch projection 6b happens to strike against something, or if it is inadvertently pushed with the finger, the closure plate 6c will not be released from the open position. In order to unlock the closure plate 6c, it is necessary to push a release pin 9 into the through hole 7 in the direction as indicated by arrow "C" to release the detent 6e from the through hole 7, and at the same time, to push the finger catch projection 6b away from the side of the "opening" by finger. Thus, unlocking requires two coordinated actions, assuring that an accidental shock to the cartridge 1 or a wrong operation will not release cartridge from the "erasing forbidden" condition.

A slit (not shown) may be made in the bottom plate of the casing 2 at a position just opposite to the opening 5, thereby allowing light from a light source (not shown) to pass through the casing when the opening is not closed and to fall on a photodetector (not shown), thereby detecting whether the opening is closed or not.

As is apparent from the above, a cartridge according to this invention is so constructed that the opening is opened or closed with a swingable closure plate and that the closure plate when brought in the open condition, is positively locked, thus permitting the operation of bringing the cartridge into either the "erasing forbidden" condition or the "erasing permitted" condition to be carried out easily and reliably as required.

We claim:

1. A magnetic recording disk cartridge comprising a magnetic recording medium composed of a flexible recording disk which is adapted to rotate at a high speed during recording and reproducing, and a generally square casing for accommodating the magnetic recording disk, said casing having an inner surface, said casing having an opening in the vicinity of one corner of the casing and an erroneous erasing preventing unit swingable across said opening by finger from a closed position to an open position, said unit having a lockarm resiliently biased towards the inner surface of said casing, and said casing having means for resiliently engaging said lockarm when said unit is brought to the open position.

2. A magnetic recording disk cartridge as defined in claim 1 wherein said means for resiliently engaging said lockarm is a detent provided on the inner surface of the casing.

3. A magnetic recording disk cartridge as defined in claim 1 or 2 wherein said lockarm has a finger catch projection appearing in the opening.

4. A magnetic recording disk cartridge comprising a magnetic recording medium composed of a flexible recording disk which is adapted to rotate at a high speed during recording and reproducing, and a generally square casing for accommodating the magnetic recording disk, said casing having a ceiling plate and a bottom plate, said ceiling and bottom plates each having an inside surface, said casing having an opening in the vicinity of one corner of the casing and an erroneous erasing preventing unit swingable across said opening by finger from a closed position to an open position, said unit comprising a cylindrical post rotatably fixed to said celing and bottom plates of said casing at a place apart from said opening and close to the corner of said casing, a closure plate extending from said cylindrical post below and along said inside surface of said ceiling plate of said casing, a finger catch projection extending upwardly from one side of said closure plate and appearing in said opening, a lockarm extending from the closure plate downwardly to the inside surface of the bottom plate of the casing and rising to a rising end above the plate, thereby pushing against the inside surface of the bottom plate and, as a counteraction, resiliently biasing the closure plate towards the ceiling plate of the casing, and a descending projection or detent extending downwardly from the rising end of the lockarm for snapping into a through hole in the bottom plate of the casing when the closure plate is brought to an erasing forbidden position, thereby positively locking the erroneous erasing preventing unit against accidental release due to any exterior force applied thereto.

* * * * *